Patented June 13, 1933

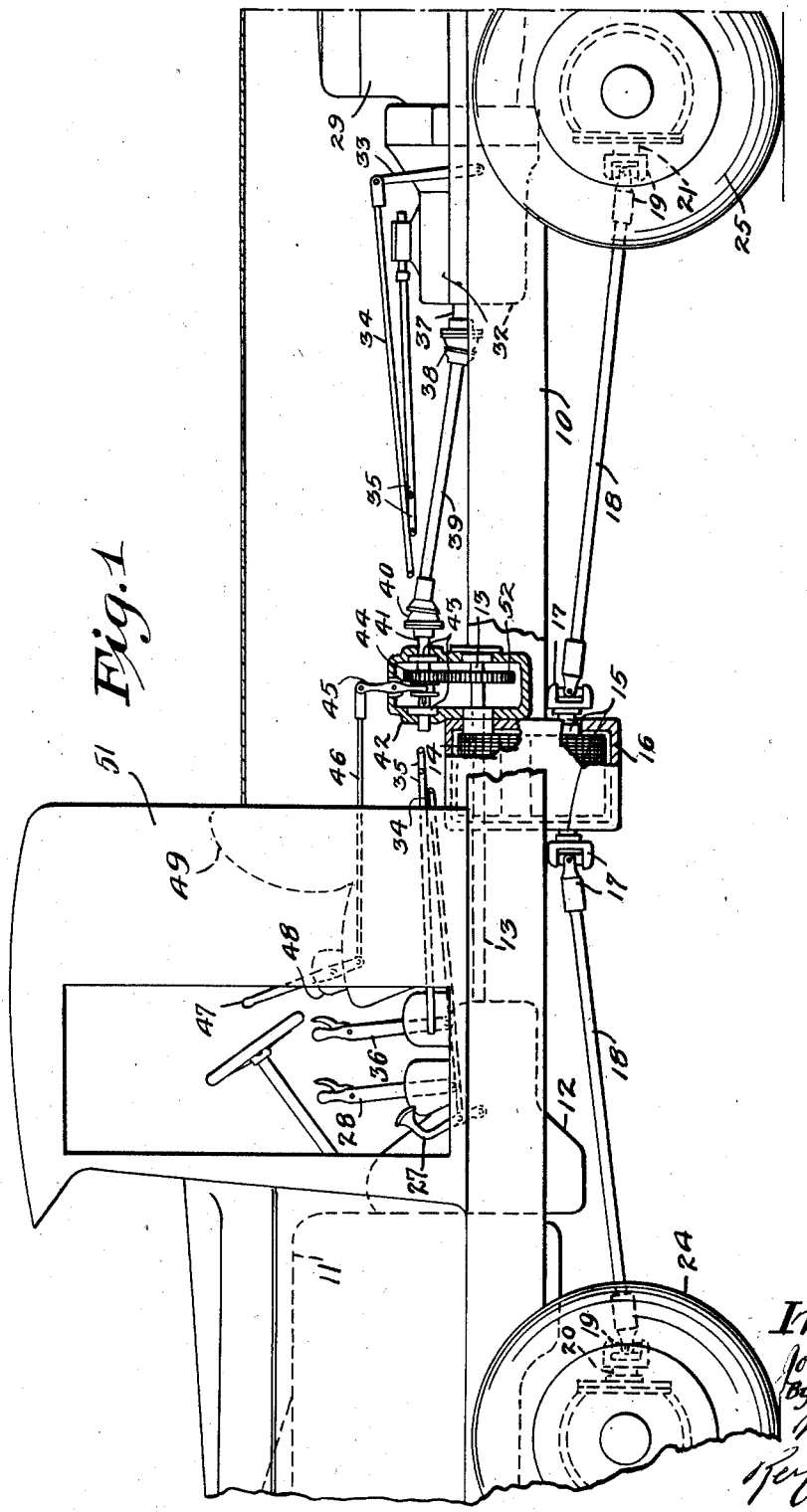

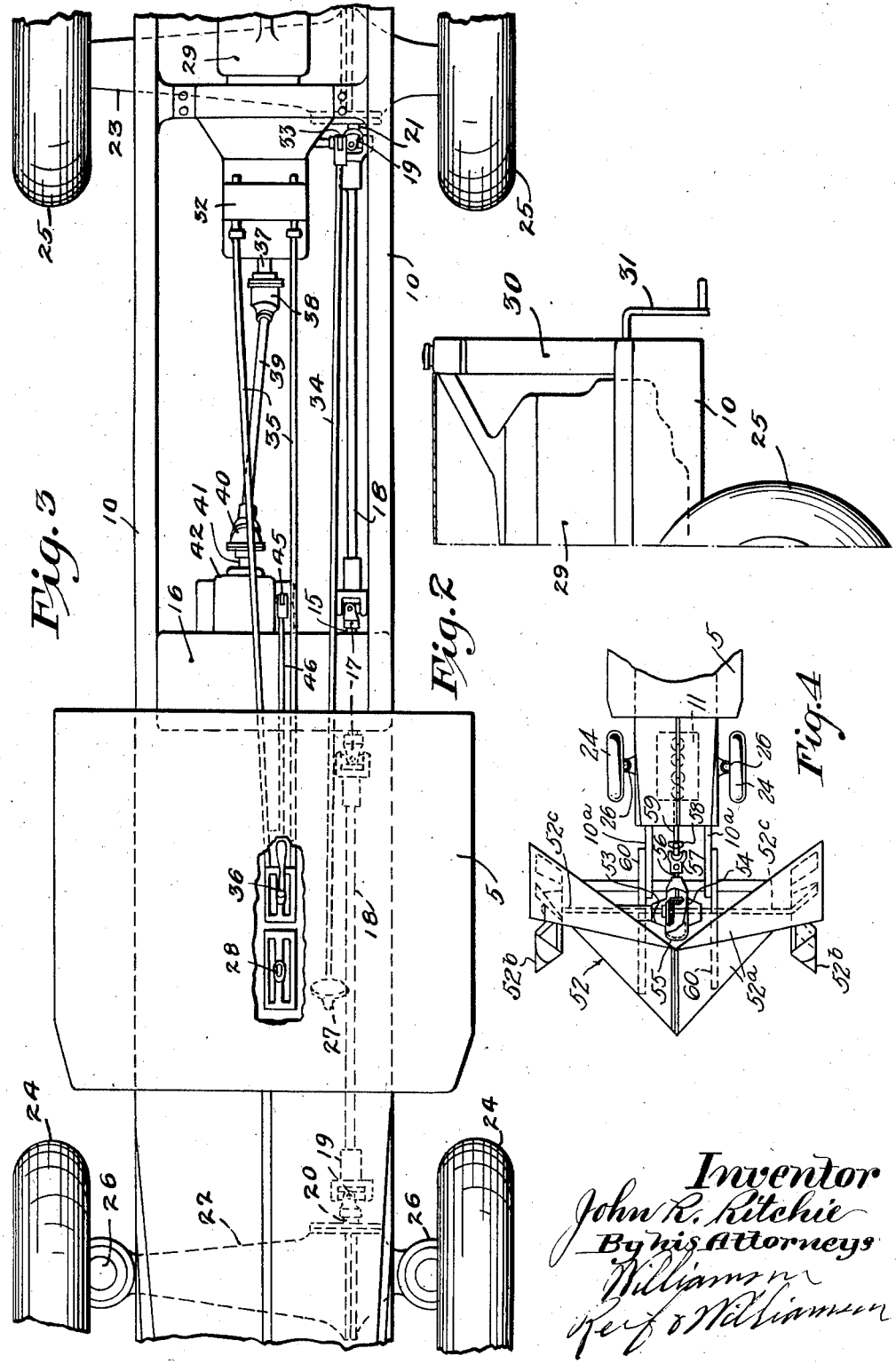

1,913,567

UNITED STATES PATENT OFFICE

JOHN R. RITCHIE, OF MINNEAPOLIS, MINNESOTA, ASSIGNOR TO ROTARY SNOW PLOW COMPANY, OF MINNEAPOLIS, MINNESOTA, A CORPORATION OF MINNESOTA

TRACTOR WITH TWO MOTORS

Application filed August 3, 1929. Serial No. 383,216.

This invention relates to an automotive vehicle, such as a truck or tractor, and while the invention may have utility with various vehicles, it particularly is provided for a truck or tractor adapted to propel a snow plow. Some snow plows, such as illustrated in the patent to John O. Johnson, No. 1,524,- 518, granted January 27, 1925, have snow propellers which are driven from the motor of the propelling truck or tractor. It has been found in practice that it is sometimes difficult to keep the motor of the tractor driving the propellers at the desired speed and at the same time to control the motor to propel the truck or tractor at the desired speed.

It is an object of this invention therefore, to provide an automotive vehicle having the usual driving motor with its transmission mechanism and controls therefor, which vehicle is provided with a second motor also having transmission mechanism including speed change gears, together with a connection to the transmission mechanism of said first mentioned motor and means for controlling said second motor.

It is a further object of the invention to provide an automotive vehicle having the usual driving motor and supporting and propelling means driven by said motor, including a speed reducing mechanism, said vehicle also having a second motor with a transmission mechanism, including speed change gears and connections from said transmission mechanism to said reducing mechanism, means being provided to connect and disconnect both motors from their transmission mechanisms and for controlling said transmission mechanisms.

It is more specifically an object of the invention to provide an automotive vehicle having the usual motor, with transmission mechanism connecting the same to four wheels of the vehicle, said mechanism including a speed reducing means, a second motor for said vehicle having a transmission mechanism, means for connecting and disconnecting said last mentioned transmission mechanism to said speed reducing means, clutches for respectively connecting and disconnecting said motors to and from their transmission mechanisms, a common means for operating said clutches and means for controlling both of said transmission mechanisms.

These and other objects and advantages of the invention will be fully set forth in the following description made in connection with the accompanying drawings, in which like reference characters refer to similar parts throughout the several views, and in which:—

Fig. 1 is a view in side elevation of an automotive vehicle having the invention applied thereto, certain parts being broken away and others shown in vertical section;

Fig. 2 is a view in side elevation of said automotive vehicle, forming a continuation of Fig. 1; and Fig. 3 is a plan view of the automotive vehicle certain parts being broken away.

Fig. 4 is a plan view showing the vehicle attached to a snow plow.

Referring to the drawings, an automotive vehicle, such as a truck is illustrated comprising frame member 10. Said frame member carries at its forward end a motor 11 illustrated as of the usual internal combustion type, which motor is adapted to be connected and disconnected as usual by a clutch, not shown, to a speed change gear carried in the housing or casing 12. This speed change gear is of the usual type used on automotive vehicles comprising several forward and one reverse speed and need not be further illustrated or described. A drive shaft 13 extends rearwardly from said speed change mechanism and has a sprocket thereon adapted to receive a speed reducing chain 14 running over a larger sprocket on a shaft 15, said chain, sprockets and shaft on which the sprockets are carried being carried in a casing 16 secured to frame 10. Shaft 15 has universal joints 17 secured to its ends outwardly of casing 16 connecting the same to shafts 18 which extend forwardly and rearwardly respectively and are connected by universal joints 19 to shafts 20 and 21 respectively which extend into differential housings 22 and 23 respectively at the front and rear of frame 10. Housings 22 and 23 will carry differential gear mechanism, such as commonly used on the rear axle of automobiles, shafts 20 and 21 having gears, not shown, secured thereto for driving said differential gear mechanism. The front wheels 24, as well as rear wheels 25 of the vehicle are thus driven. The wheels 24 are mounted on knuckles pivoted on the shafts 26 so that the vehicle may be steered. The structure so far described is one that is well known and is a standard four wheel drive construction for a truck. The clutch pedal 27 for operating the clutch connecting motor 11 to its transmission mechanism is illustrated, as is also the gear shift lever 28 for shifting the speed change gears in casing 12.

In accordance with the present invention, a second motor 29 is provided and while this motor might be mounted at different places, in the embodiment of the invention illustrated it is shown as mounted at the rear of frame 10. Said motor will be of the same type as motor 11, but preferably somewhat smaller. The same will be provided with the usual radiator 30 and a crank 31 is shown for turning over the motor. The motor 29 will be provided with the usual speed change gear mechanism not shown, which is housed in the gear casing 32. A clutch will also as usual be provided for connecting motor 29 to and disconnecting it from its transmission mechanism, which clutch is operated by a lever 33 which is connected by the link 34 to pedal lever 27. Pedal lever 27, therefore is used to operate the clutch of both motors. Rods 35 extend from the movable shifting members of the speed change gear mechanism in casing 32 to a lever 36 mounted adjacent the lever 28 so that the driver can control said speed change gear mechanism of motor 29. A driving shaft 37 projects from casing 32 and is connected by a universal joint 38 to a shaft 39. Shaft 39 extends upwardly and forwardly and is connected by another universal joint 40 to a shaft 41. Shaft 41 is journaled in a gear casing 42 which is provided and carried by frame 10. Shaft 41 has collars 43 secured thereto engaging the sides of casing 42 to prevent endwise movement of said shaft. A gear 44 is splined on shaft 41 and provided with a clutch collar engaged by the lower forked end of a lever 45 pivoted at the top of casing 42 and extending above the top thereof. Lever 45 is connected by a link 46 to a hand lever 47 pivoted to a segment 48 carried adjacent the driver's seat 49. It will be seen that clutch pedal lever 27, the hand levers 28, 36 and 47, seat 49 and the steering wheel 50 are disposed in the cab 51 of the truck or vehicle. The gear or pinion 44 meshes with a larger gear 52 secured to the rear end of shaft 13 which is extended to the rear of casing 16. While the ratio of gears 44 and 52 may of course vary, in one embodiment of the invention this ratio has been substantially one to four.

In Fig. 4 a snow plow 52 is shown comprising the mold board 52a and the snow propellers 52b. Propellers 52b are driven respectively by shafts 52c connected to and driven by a beveled gear 53 which meshes with another beveled gear or pinion 54. Beveled gears 53 and 54 are enclosed in a housing 55 having bearings therein for the shafts 52c and for a shaft 56 extending rearwardly from housing 55 and secured to beveled gear 54. Shaft 56 is connected to one member 57 of a universal joint, the other member 58 of which is connected to a shaft 59 forming the crank shaft of motor 11. Members 10a extend forward from the frame 10 and are connected to bars 60 connected to the plow 52.

In operation, when the vehicle is used to drive a plow, the connection will be made by coupling the crank shaft of motor 11 at its front end to the driving shaft of the plow, as shown in the above cited patent. With the described structure the operator can shift lever 28 to place the motor 11 or the transmission mechanism 12 thereof in neutral position. Motor 11 will then not be connected to shaft 13 and will not act to drive the vehicle. Motor 11 will then be used simply to drive the propellers of the snow plow. Motor 11 at this time through its extended crank shaft 59 and through the universal joint comprising members 57 and 58 rotates shaft 56 and beveled gear 54. Beveled gear 54 in turn drives beveled gear 53, thus driving shafts 52 and the propellers 52b of the snow plow. As the plow is pushed forward by the vehicle, the snow slides up the mold board 52a and is guided outwardly thereby to the propellers 52b which propel the snow outwardly. At such time lever 47 will be shifted to bring gears 44 and 52 into mesh and motor 29 will be driven so that said motor will drive shaft 13 and chain 14 and will furnish the power for driving the wheels or other propelling means of the vehicle. The driver can shift lever 36 to have the transmission mechanism 32 held either in low, intermediate or high speed and the truck can be driven at the desired speed and the plow propelled as fast as the depth of the snow and operating conditions will permit. When motor 11 is to be used to propel the vehicle, lever 47 will be swung to shift gear 44 out of mesh with gear 52 and motor 29 will then be disconnected from the propelling mechanism.

From the above description it is seen that applicant has provided a comparatively simple and efficient vehicle particularly adapted for propelling a snow plow or other operating member. It will be understood that in the embodiment of the invention illustrated the motor 29 with its transmission mechanism is merely added to the standard machine as is the casing 42 with its gears and the control mechanism for motor 29 and gear 44. A standard truck or tractor can thus be readily converted. The device has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A four-wheel automotive vehicle having in combination, a frame, a motor on the front of said frame having a crank shaft adapted to drive another device, a speed change mechanism for said motor, a shaft leading from said mechanism, a reducing gear mechanism connected to said shaft, a differential mechanism for driving an axle of said vehicle, a shaft leading from said reducing gear mechanism to said differential mechanism, a second motor carried on said frame, a second speed changing mechanism, a shaft leading from said second speed changing mechanism to said reducing gear, and means for connecting and disconnecting said last mentioned shaft to and from said reducing gear respectively.

2. The structure set forth in claim 1, said vehicle having a single driver's position, and means disposed for convenient manipulation by the driver for operating both of said speed changing mechanisms and for operating said last mentioned means.

3. An automotive vehicle having in combination, a frame, front and rear axles supporting said frame, wheels mounted upon said axles, a speed reducing mechanism, means extending from said mechanism to each of said axles for driving the latter, a motor at the front of said frame, a speed change mechanism connected to said motor, connections between said speed change mechanism and said speed reducing mechanism, a second motor carried by said frame, a speed change mechanism connected thereto, means connecting said last mentioned speed change mechanism and said reducing speed mechanism, and a clutch device for disconnecting said last mentioned means and said speed reducing mechanism.

4. The structure set forth in claim 3, said means connecting said last mentioned speed change mechanism and said speed reducing mechanism including a set of speed reducing gears.

5. The structure set forth in claim 3, said vehicle having a single driver's position, and means disposed in convenient position for manipulation by the driver in said position for operating both of said speed change mechanisms and said clutch device.

6. An automotive vehicle having in combination, a frame, front and rear wheel-equipped axles supporting said frame, a transmission device between said axles, shafts extending from said transmission device to each of said axles for driving the same, a motor at the front of said frame, a speed changing mechanism connected to said motor and connected to said transmission device, a motor in the rear of said transmission device, a speed change mechanism connected to said last mentioned motor and connected to said transmission device, said vehicle having a single driver's position and steering device, and means disposed in convenient position for manipulation by the driver in said position and adjacent said steering device for independently operating both of said speed change mechanisms.

7. The structure set forth in claim 6, and means for disconnecting said last mentioned speed change mechanism from said transmission device, and means adjacent said driver's position for operating said last mentioned means.

8. An automotive vehicle having in combination, a frame, front and rear wheel-equipped axles supporting said frame, a motor at the front of said frame, a speed changing mechanism connected to said motor, means connecting said speed changing mechanism with one of said axles for driving the latter, a second motor at the rear of said frame, a second speed changing mechanism connected to said second motor, means connecting said second speed changing mechanism to said axle for driving the latter, said vehicle having a single driver's position, and means disposed in convenient position for manipulation from said driver's position for independently operating both of said speed changing mechanisms.

9. The structure set forth in claim 8, and additional means for disconnecting said second speed changing mechanism from said axle, and means adjacent said driver's position for controlling said last mentioned means.

10. An automotive vehicle having in combination, a frame, front and rear wheel-equipped axles supporting said frame, said vehicle having a single driver's position and a single steering mechanism, a motor on said frame in front of said driver's position, a speed changing mechanism connected to said motor and connected to one of said axles for driving the same, a second motor at the rear of the frame, a second speed-changing mechanism connected to said second motor, means connecting said second speed changing mechanism to said axle including a speed reducing gear, and means disposed in convenient position for manipulation from said driver's position for independently operating said speed changing mechanisms.

In testimony whereof I affix my signature.

JOHN R. RITCHIE.